US009365718B2

(12) United States Patent
Luo et al.

(10) Patent No.: US 9,365,718 B2
(45) Date of Patent: Jun. 14, 2016

(54) LOW CHLORINE FIBER FILLED MELT PROCESSED POLYARYLENE SULFIDE COMPOSITION

(71) Applicant: Ticona LLC, Florence, KY (US)

(72) Inventors: Rong Luo, Florence, KY (US); Xinyu Zhao, Cincinnati, OH (US); Ke Feng, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 360 days.

(21) Appl. No.: 13/621,864

(22) Filed: Sep. 18, 2012

(65) Prior Publication Data

US 2013/0072630 A1  Mar. 21, 2013

Related U.S. Application Data

(60) Provisional application No. 61/536,721, filed on Sep. 20, 2011.

(51) Int. Cl.
| C08L 81/04 | (2006.01) |
| B32B 15/08 | (2006.01) |
| C08K 5/372 | (2006.01) |
| C08G 75/02 | (2016.01) |
| C08K 7/02 | (2006.01) |

(52) U.S. Cl.
CPC ............... *C08L 81/04* (2013.01); *B32B 15/08* (2013.01); *C08G 75/029* (2013.01); *C08K 5/372* (2013.01); *C08K 7/02* (2013.01)

(58) Field of Classification Search
CPC .......... H05K 5/93; C08G 75/14; C08L 27/22; C07F 7/082
USPC .......................................... 524/609; 525/537
See application file for complete search history.

(56) References Cited

U.S. PATENT DOCUMENTS

| 3,725,362 A | 4/1973 | Walker |
| 3,729,404 A | 4/1973 | Morgan |
| 4,021,596 A | 5/1977 | Bailey |
| 4,119,617 A | 10/1978 | Hanyuda et al. |
| 4,276,397 A | 6/1981 | Froix |
| 4,436,865 A * | 3/1984 | Beever .......................... 524/504 |
| 4,605,713 A | 8/1986 | Heitz et al. |
| 4,678,831 A | 7/1987 | Kawabata et al. |
| 4,760,128 A | 7/1988 | Ebert et al. |
| 4,769,424 A | 9/1988 | Takekoshi et al. |
| 4,820,801 A | 4/1989 | Inoue et al. |
| 4,889,893 A | 12/1989 | Kobayashi et al. |
| 4,935,473 A | 6/1990 | Fukuda et al. |
| 5,015,704 A | 5/1991 | Takekoshi et al. |
| 5,047,465 A | 9/1991 | Auerbach |
| 5,057,264 A | 10/1991 | Bier et al. |
| 5,068,312 A | 11/1991 | Dorf et al. |
| 5,070,127 A | 12/1991 | Auerbach |
| 5,122,578 A | 6/1992 | Han et al. |
| 5,151,458 A | 9/1992 | Heinz et al. |
| 5,182,334 A | 1/1993 | Chen, Sr. et al. |
| 5,218,043 A | 6/1993 | Kubota et al. |
| 5,227,427 A | 7/1993 | Seizawa et al. |
| 5,276,107 A | 1/1994 | Kim et al. |
| 5,384,196 A | 1/1995 | Inoue et al. |
| 5,418,281 A | 5/1995 | Yung et al. |
| 5,436,300 A | 7/1995 | Kashiwadate et al. |
| 5,488,084 A | 1/1996 | Kadoi et al. |
| 5,504,141 A | 4/1996 | Collard et al. |
| 5,541,243 A | 7/1996 | Ohmura et al. |
| 5,652,287 A | 7/1997 | Sullivan et al. |
| 5,654,383 A * | 8/1997 | Kohler et al. .................. 525/537 |
| 5,679,284 A | 10/1997 | Kurita |
| 5,780,583 A | 7/1998 | Lubowitz et al. |
| 5,959,071 A | 9/1999 | DeMoss et al. |
| 5,981,007 A | 11/1999 | Rubin et al. |
| 5,997,765 A | 12/1999 | Furuta et al. |
| 6,001,934 A | 12/1999 | Yamanaka et al. |
| 6,010,760 A | 1/2000 | Miyazaki et al. |
| 6,080,822 A | 6/2000 | Haubs et al. |
| 6,117,950 A | 9/2000 | Yamao et al. |
| 6,130,292 A | 10/2000 | Harwood et al. |
| 6,201,098 B1 | 3/2001 | Haubs et al. |
| 6,280,668 B1 | 8/2001 | Saito et al. |
| 6,317,314 B1 | 11/2001 | Kung et al. |
| 6,339,400 B1 | 1/2002 | Flint et al. |
| 6,476,106 B1 | 11/2002 | Murakami et al. |

(Continued)

FOREIGN PATENT DOCUMENTS

| CN | 101768358 | 7/2010 |
| CN | 102140233 | 8/2011 |
| CN | 102181156 | 9/2011 |
| CN | 102532898 | 7/2012 |
| DE | 3813919 | 11/1989 |
| DE | 4138906 | 6/1993 |
| EP | 0 225 471 A1 | 6/1987 |
| EP | 0405135 | 1/1991 |
| EP | 0432561 | 6/1991 |

(Continued)

OTHER PUBLICATIONS

Jul. 24, 2013 International Search Report and Written Opinion of application PCT/US2012/055855.
Machine Translation of Japanese Patent—JP2010070706, Aug. 12, 2015, 12 pages.

*Primary Examiner* — Robert Harlan

(74) *Attorney, Agent, or Firm* — Dority & Manning, P.A.

(57) ABSTRACT

Melt processed polyarylene sulfide compositions are described as are methods of forming the melt processed polyarylene sulfide compositions. The melt processed polyarylene sulfide compositions are formed according to a melt processing method that includes melt processing a mixture that includes a starting polyarylene sulfide, a disulfide compound and a filler. The melt processed polyarylene sulfide compositions may provide low chlorine content products having excellent strength characteristics.

26 Claims, 3 Drawing Sheets

(56) References Cited

U.S. PATENT DOCUMENTS

| | | |
|---|---|---|
| 6,608,136 B1 | 8/2003 | Dean et al. |
| 6,645,623 B2 | 11/2003 | Dean et al. |
| 6,699,946 B1 | 3/2004 | Lambla et al. |
| 6,730,378 B2 | 5/2004 | Matsuoka et al. |
| 6,793,847 B2 | 9/2004 | Maeda et al. |
| 6,830,792 B1 | 12/2004 | Matsuoka et al. |
| 6,875,517 B2 | 4/2005 | Bosshammer et al. |
| 6,889,719 B2 | 5/2005 | Watanabe et al. |
| 6,900,272 B2 | 5/2005 | Matsouka et al. |
| 6,960,628 B2 | 11/2005 | Matsouka et al. |
| 7,115,312 B2 | 10/2006 | Matsuoka et al. |
| 7,118,691 B2 | 10/2006 | Elkovitch et al. |
| 7,169,887 B2 | 1/2007 | Papke |
| 7,235,612 B2 | 6/2007 | Kobayashi et al. |
| 7,271,769 B2 | 9/2007 | Asano et al. |
| 7,301,783 B2 | 11/2007 | Homer et al. |
| 7,303,822 B1 | 12/2007 | Matsuoka et al. |
| 7,385,806 B2 | 6/2008 | Liao |
| 7,462,672 B2 | 12/2008 | Kobayashi et al. |
| 7,486,243 B2 | 2/2009 | Wulff et al. |
| 7,486,517 B2 | 2/2009 | Aapro et al. |
| 7,518,568 B2 | 4/2009 | Tracy et al. |
| 7,553,925 B2 | 6/2009 | Bojkova |
| 7,608,666 B2 | 10/2009 | Matsuoka et al. |
| 7,960,473 B2 | 6/2011 | Kobayshi et al. |
| 7,974,660 B2 | 7/2011 | Hsu et al. |
| 7,989,079 B2 | 8/2011 | Lee et al. |
| 8,005,429 B2 | 8/2011 | Conway et al. |
| 8,026,309 B2 | 9/2011 | Halahmi et al. |
| 8,044,142 B2 | 10/2011 | Akiyama et al. |
| 8,076,423 B2 | 12/2011 | Ishio et al. |
| 8,152,071 B2 | 4/2012 | Doherty et al. |
| 8,168,732 B2 | 5/2012 | Ajbani et al. |
| 8,258,242 B2 | 9/2012 | Hiroi et al. |
| 8,338,547 B2 | 12/2012 | Takahashi et al. |
| 8,367,210 B2 | 2/2013 | Naritomi et al. |
| 8,426,552 B2 | 4/2013 | Hinokimori et al. |
| 8,462,054 B2 | 6/2013 | Yang et al. |
| 2003/0050091 A1 | 3/2003 | Tsai et al. |
| 2004/0257283 A1 | 12/2004 | Asano et al. |
| 2005/0104190 A1 | 5/2005 | Mithal et al. |
| 2006/0257624 A1 | 11/2006 | Naritomi et al. |
| 2009/0011163 A1 | 1/2009 | Ajbani |
| 2009/0267266 A1 | 10/2009 | Lee et al. |
| 2009/0280347 A1 | 11/2009 | Yu |
| 2010/0048777 A1 | 2/2010 | Kodama et al. |
| 2010/0249342 A1 | 9/2010 | Unohara et al. |
| 2011/0037193 A1 | 2/2011 | Takada et al. |
| 2011/0089792 A1 | 4/2011 | Casebolt et al. |
| 2011/0090630 A1 | 4/2011 | Bergerone et al. |
| 2011/0134012 A1 | 6/2011 | Yang et al. |
| 2011/0169700 A1 | 7/2011 | Degner et al. |
| 2012/0065361 A1 | 3/2012 | Konno et al. |
| 2012/0237714 A1 | 9/2012 | Nishikawa et al. |
| 2013/0035440 A1 | 2/2013 | Nishikawa et al. |
| 2013/0059976 A1 | 3/2013 | Matsuo et al. |
| 2013/0069001 A1 | 3/2013 | Luo et al. |
| 2013/0071638 A1 | 3/2013 | Luo et al. |
| 2013/0072629 A1 | 3/2013 | Luo et al. |
| 2013/0225771 A1 | 8/2013 | Kanomata et al. |
| 2013/0249357 A1 | 9/2013 | Luo et al. |

FOREIGN PATENT DOCUMENTS

| | | |
|---|---|---|
| EP | 0546185 | 6/1993 |
| EP | 0549977 | 7/1993 |
| EP | 0568945 | 11/1993 |
| JP | 03-231969 A | 10/1991 |
| JP | 05-086266 A | 4/1993 |
| JP | 05-170907 A | 7/1993 |
| JP | 05-230371 A | 9/1993 |
| JP | 08-151518 A | 6/1996 |
| JP | 11-140315 A | 5/1999 |
| JP | 2980054 B | 11/1999 |
| JP | 3034335 B | 4/2000 |
| JP | 2001-172501 A | 6/2001 |
| JP | 3227729 B | 11/2001 |
| JP | 2004-182754 A | 7/2004 |
| JP | 3579957 B | 10/2004 |
| JP | 3601090 B | 12/2004 |
| JP | 3637715 B | 4/2005 |
| JP | 3800783 B | 7/2006 |
| JP | 2006-316207 A | 11/2006 |
| JP | 3867549 B | 1/2007 |
| JP | 2007-197714 A | 8/2007 |
| JP | 2007-277292 A | 10/2007 |
| JP | 4038607 B | 1/2008 |
| JP | 4129674 B | 8/2008 |
| JP | 4196647 B | 12/2008 |
| JP | 2009-256480 A | 11/2009 |
| JP | 2009-263635 A | 11/2009 |
| JP | 2010-053356 A | 3/2010 |
| JP | 2010-070706 | * 4/2010 |
| JP | 2010-070706 A | 4/2010 |
| JP | 2010-084125 A | 4/2010 |
| JP | 4495261 B | 6/2010 |
| JP | 2010-195874 A | 9/2010 |
| JP | 4552315 B | 9/2010 |
| JP | 4943399 B | 5/2012 |
| JP | 5029881 B | 9/2012 |
| WO | WO 2009/033349 | 3/2009 |
| WO | WO 2009128260 A1 | 10/2009 |

\* cited by examiner

LOW CHLORINE FIBER FILLED MELT PROCESSED POLYARYLENE SULFIDE COMPOSITION

CROSS REFERENCE TO RELATED APPLICATION

The present application claims filing benefit of U.S. Provisional Patent Application Ser. No. 61/536,721 having a filing date of Sep. 20, 2011, which is incorporated herein by reference.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of p-dichlorobenzene with an alkali metal sulfide or an alkali metal hydrosulfide, forming polymers that include chlorine at the terminal groups. With low halogen-content polymeric materials becoming increasingly desired due to environmental concerns, attempts have been made to produce low chlorine content polyarylene sulfide compositions. In general, this has involved utilizing higher molecular weight polymers in the compositions, as higher molecular weight polyarylene sulfides will include fewer terminal groups and hence have lower chlorine content.

Unfortunately, high molecular weight polyarylene sulfides have high melt viscosity, and this presents processability issues that may complicate formation techniques. This problem may be aggravated with the inclusion in a polyarylene sulfide composition of fillers that may improve desirable characteristics of the formed composites but also further increase melt viscosity of the composition.

The utilization of lower molecular weight polyarylene sulfides may improve processability of a composition, but the high chlorine content is still a problem, and the inclusion of additives to improve physical characteristics of a composition may lead back to processability problems, as the add-in level for additives may be quite high in order that the composition including the low molecular weight polyarylene sulfide exhibit the desired physical characteristics.

What are needed in the art are melt processed polyarylene sulfide compositions that have a relatively low melt viscosity for good processability while still providing desirable physical characteristics and low chlorine content. In addition, what are needed are facile, straightforward methods for forming the melt processed polyarylene sulfide compositions that do not require complicated or extensive processing steps.

SUMMARY OF THE INVENTION

Disclosed in one embodiment is a method for forming a melt processed polyarylene sulfide composition. A method can include melt processing a mixture to form the melt processed polyarylene sulfide composition. The mixture can include a starting polyarylene sulfide, a filler, and a disulfide compound The melt processed polyarylene sulfide composition can have a melt viscosity of less than about 2000 poise as determined in accordance with ISO Test No. 11443 at a shear rate of 1200 s$^{-1}$ and at a temperature of 310° C. The ratio of the melt viscosity of the starting polyarylene sulfide to the melt viscosity of the melt processed polyarylene sulfide composition can be greater than about 1.25. In addition, the melt processed polyarylene sulfide composition can have a chlorine content of less than about 1000 ppm.

Also disclosed is a melt processed polyarylene sulfide composition. For example, a melt processed polyarylene sulfide composition can include a polyarylene sulfide and a filler. The melt processed polyarylene sulfide composition can have a melt viscosity of less than about 2000 poise as determined in accordance with ISO Test No. 11443 at a shear rate of 1200 s$^{-1}$ and at a temperature of 310° C. The melt processed polyarylene sulfide composition can have a chlorine content of less than about 1000 ppm, and the melt processed polyarylene sulfide composition can have a deflection temperature under load of greater than about 200° C., as determined in accordance with ISO Test No. 75-2 at a load of 1.8 MPa.

Also disclosed are products including a melt processed polyarylene sulfide composition. Products can include, but are not limited to, electrical connectors and overmoldings.

BRIEF DESCRIPTION OF THE FIGURES

The present disclosure may be better understood with reference to the following figures.

DETAILED DESCRIPTION

Figure 1:
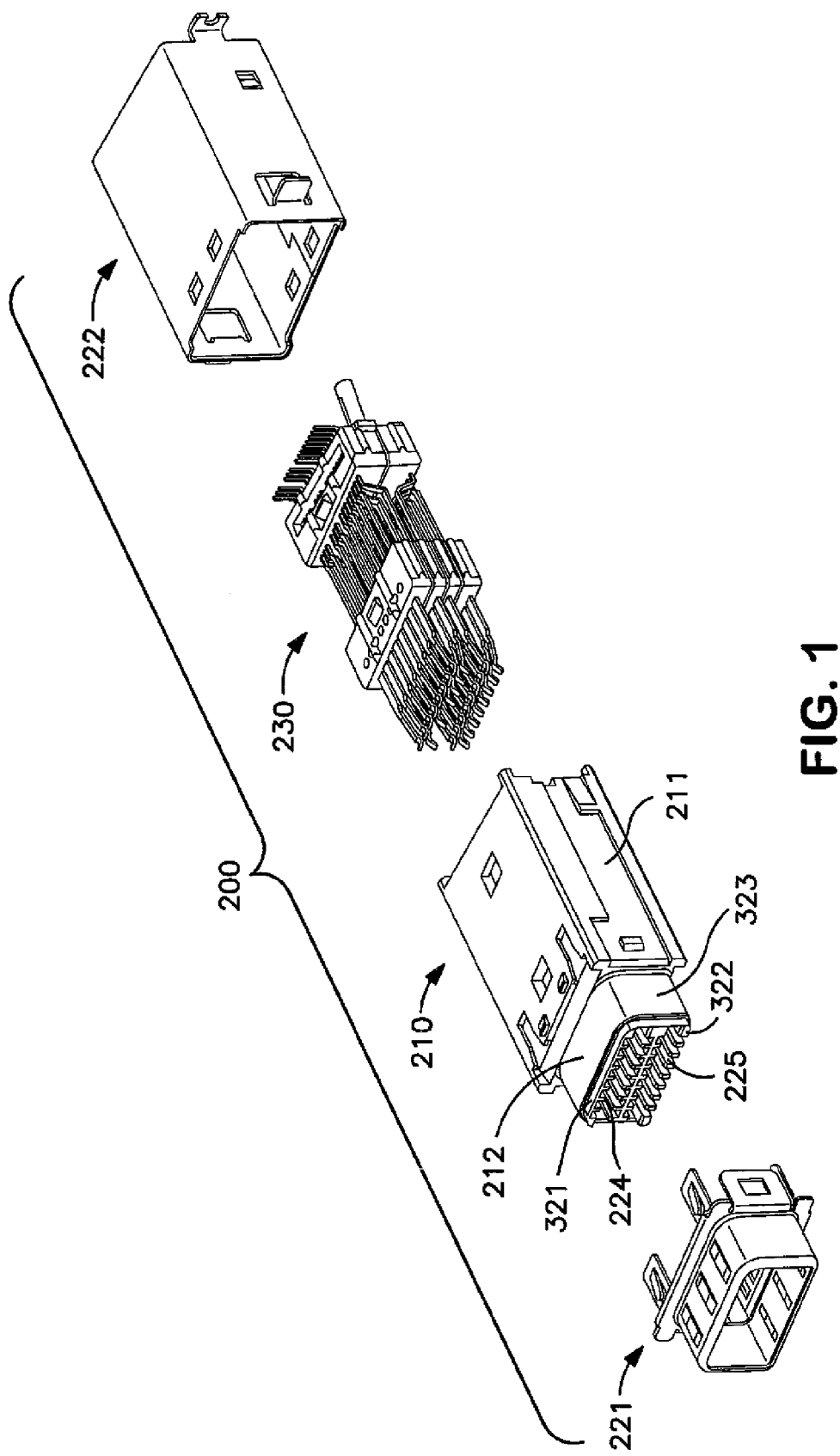
FIG. 1 illustrates an exploded view of an electrical connector as may incorporate a melt processed polyarylene sulfide composition as described herein.

The present disclosure is generally directed to melt processed polyarylene sulfide compositions and methods for forming the melt processed polyarylene sulfide compositions. The melt processed polyarylene sulfide compositions can be formed according to a process that includes combination of a disulfide compound and a starting polyarylene sulfide to form a mixture. In addition, a filler can be incorporated into the mixture, e.g., in the extruder, and the mixture can be melt processed to form the melt processed polyarylene sulfide composition. The filled melt processed polyarylene sulfide composition can have low chlorine content and can exhibit excellent processability and mechanical characteristics. Without wishing to be bound by any particular theory, it is believed that a polymer scission reaction in the mixture between the disulfide compound and the starting polyarylene sulfide leads to a lower melt viscosity product. In addition, it is believed that melt processing a mixture including a starting polyarylene sulfide, a disulfide compound, and a filler may enhance the benefits of the filler in the melt processed polyarylene sulfide composition. For instance, it is believed that addition of the disulfide compound during melt processing lowers the overall melt viscosity of the melt processed polyarylene sulfide composition, which leads to decreased attrition of the filler and improved mechanical properties due to the integrity of the fillers. The formation process may take place by melt processing the mixture including the starting polyarylene sulfide, the disulfide compound, and the filler in a melt extruder to form the melt processed polyarylene sulfide composition. The process may thus be a relatively simple formation process that can lead to cost savings.

I. The Melt Processed Polyarylene Sulfide Composition

A melt processed polyarylene sulfide composition can include a polyarylene sulfide and a filler. The melt processed polyarylene sulfide composition may be formed by melt processing a mixture including a starting polyarylene sulfide, a filler, and a disulfide compound in a system designed for melt processing. For instance, a mixture may be melt processed in an extruder.

In the extruder, interaction between the disulfide compound and the starting polyarylene sulfide can decrease the melt viscosity of the melt processed polyarylene sulfide composition, and particularly, can decrease the melt viscosity of the polyarylene sulfide in the melt processed polyarylene sulfide composition. For example, a melt processed polyarylene sulfide composition may have a melt viscosity of less than about 2000 poise, less than about 1500 poise, or less than about 1200 poise as determined in accordance with ISO Test No. 11443 at a shear rate of 1200 s$^{-1}$ and at a temperature of 310° C.

In contrast to the melt viscosity of the melt processed polyarylene sulfide composition, the melt viscosity of the starting polyarylene sulfide that is included in the mixture can be quite high. The formation process can form a melt processed polyarylene sulfide composition that has a melt viscosity that is lower than the melt viscosity of the starting polyarylene sulfide, and thus the melt processed polyarylene sulfide composition can exhibit improved processibility as compared to the starting polyarylene sulfide. For instance, the ratio of the melt viscosity of the starting polyarylene sulfide to that of the melt processed polyarylene sulfide composition can be greater than about 1.25, greater than about 2, or greater than about 3.

In addition, the melt processed polyarylene sulfide composition can be a homogeneous composition and can exhibit excellent mechanical characteristics. It is believed that the additive effect of the starting polyarylene sulfide, the disulfide compound, and the filler in the mixture can provide a melt processed polyarylene sulfide composition with excellent processibility and product characteristics.

The melt processed polyarylene sulfide composition may have a tensile stress of greater than about 120 MPa, or greater than about 125 MPa, as measured according to ISO Test No. 527 (technically equivalent to ASTM D638) at a temperature of 23° C. and at a test speed of 5 mm/min.

The melt processed polyarylene sulfide composition can have a flexural stress of greater than about 190 MPa, or greater than about 192 MPa, as measured according to ISO Test No. 178 (technically equivalent to ASTM D790) as measured at a testing temperature was 23° C. and testing speed of 2 mm/min.

The melt processed polyarylene sulfide composition may have a deflection temperature under load (DTUL) of greater than about 200° C., greater than about 230° C., or greater than about 260° C., as measured according to ISO Test No. 75-2 (technically equivalent to ASTM D648-07) at a load of 1.8 MPa.

The melt processed polyarylene sulfide composition may have a good Izod notched impact strength (Notched Izod) as measured according to ISO Test No. 80 (technically equivalent to ASTM D256). For instance, the Izod impact strength of the melt processed polyarylene sulfide composition may be greater than about 4.0 kJ/m$^2$, or greater than about 4.2 kJ/m$^2$ measured at 23° C.

The melt processed polyarylene sulfide composition can exhibit other beneficial characteristics as well. For instance, the composition can exhibit good heat resistance and flame retardant characteristics. For instance, the composition can meet the V-0 flammability standard at a thickness of 0.8 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

TABLE 1

| Rating | Afterflame Time (s) | Burning Drips | Burn to Clamp |
|---|---|---|---|
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.8 millimeters.

The starting polyarylene sulfide can be a high molecular weight, high melt viscosity polyarylene sulfide that can have a low chlorine content. As such, the melt processed polyarylene sulfide composition can also have a low chlorine content. For instance, the melt processed polyarylene sulfide composition can have a chlorine content of less than about 1000 ppm, less than about 900 ppm, less than about 600 ppm, or less than about 400 ppm.

II. Components

The melt processed polyarylene sulfide composition can be formed according to a process that includes melt processing a mixture of components. The mixture can include as components a starting polyarylene sulfide, a disulfide compound, and a filler, as well as one or more optional components.

A. Starting Polyarylene Sulfide

In general, the starting polyarylene sulfide may be a polyarylene thioether containing repeat units of the formula (I):

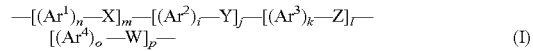

$$-[(Ar^1)_n-X]_m-[(Ar^2)_i-Y]_j-[(Ar^3)_k-Z]_l-[(Ar^4)_o-W]_p- \qquad (I)$$

wherein Ar$^1$, Ar$^2$, Ar$^3$, and Ar$^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units Ar$^1$, Ar$^2$, Ar$^3$, and Ar$^4$ may be selectively substituted or unsubstituted. Advantageous arylene systems are phenylene, biphenylene, naphthylene, anthracene and phenanthrene. The starting polyarylene sulfide typically includes more than about 30 mol %, more than about 50 mol %, or more than about 70 mol % arylene sulfide (—S—) units. In one embodiment the starting polyarylene sulfide includes at least 85 mol % sulfide linkages attached directly to two aromatic rings.

In one embodiment, the starting polyarylene sulfide is a polyphenylene sulfide, defined herein as containing the phenylene sulfide structure (C$_6$H$_4$—S)$_n$— (wherein n is an integer of 1 or more) as a component thereof.

The starting polyarylene sulfide may be synthesized during the process of forming the melt processed polyarylene sulfide composition, though this is not a requirement, and a starting polyarylene sulfide can also be purchased from known suppliers. For instance Fortron® polyphenylene sulfide available from Ticona of Florence, Ky., USA can be purchased and utilized as the starting polyarylene sulfide.

Synthesis techniques that may be used in making a starting polyarylene sulfide are generally known in the art. By way of example, a process for producing a starting polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the starting polyarylene sulfide or to regulate the polymerization reaction and/or the molecular weight of the starting polyarylene sulfide.

The starting polyarylene sulfide may be a homopolymer or may be a copolymer. By a suitable, selective combination of dihaloaromatic compounds, a starting polyarylene sulfide copolymer can be formed containing not less than two different units. For instance, in the case where p-dichlorobenzene is used in combination with m-dichlorobenzene or 4,4'-dichlorodiphenylsulfone, a starting polyarylene sulfide copolymer can be formed containing segments having the structure of formula (II):

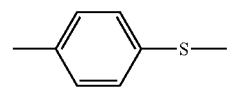

(II)

and segments having the structure of formula (III):

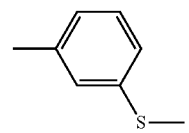

(III)

or segments having the structure of formula (IV):

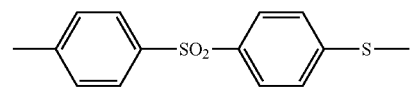

(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the starting polyarylene sulfide can include alkyl halide (generally alkyl chloride) end groups.

In another embodiment, a starting polyarylene sulfide copolymer may include a first segment with a number-average molar mass Mn of from 1000 to 20,000 g/mol that includes first units that have been derived from structures of the formula (V):

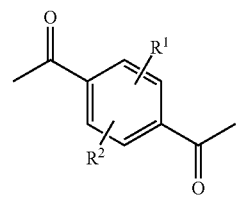

(V)

where the radicals $R^1$ and $R^2$, independently of one another, are a hydrogen, fluorine, chlorine or bromine atom or a branched or unbranched alkyl or alkoxy radical having from 1 to 6 carbon atoms; and/or second units that are derived from structures of the formula (VI):

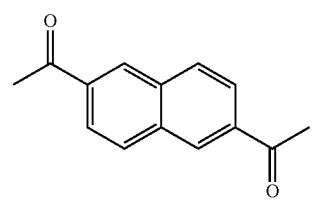

(VI)

The first unit may be p-hydroxybenzoic acid or one of its derivatives, and the second unit may be composed of 2-hydroxynaphthalene-6-carboxylic acid.

A starting polyarylene sulfide copolymer can include a second segment derived from a polyarylene sulfide structure of the formula (VII):

$$—[—Ar—S—]—_q \quad \text{(VII)}$$

where Ar is an aromatic radical, or more than one condensed aromatic radical, and q is a number from 2 to 100, in particular from 5 to 20. The radical Ar in formula (VII) may be a phenylene or naphthylene radical. In one embodiment, the second segment may be derived from poly(m-thiophenylene), from poly(o-thiophenylene), or from poly(p-thiophenylene).

The first segment of a starting polyarylene sulfide copolymer may include both the first and second units. The first and second units may be arranged with random distribution or in alternating sequence in the first segment. The molar ratio of the first and second units in the first segment may be from 1:9 to 9:1.

As stated, a process for producing the starting polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

When carrying out the first polymerization step, the alkali metal sulfide, which usually includes water, can be charged into the organic amide solvent and the mixture can be heated to distill the excessive water out of the reaction system. At that time, a part of the alkali metal sulfide will decompose to form an alkali and hydrogen sulfide (H$_2$S). From the generated amount of H$_2$S, the effective amount of the charged alkali metal sulfide is calculated. Thereafter, the dihaloaromatic compound can be charged into the reaction system in an amount calculated from the effective amount of the charged alkali metal sulfide and the mixture can be heated to a temperature of from about 180° C. to about 235° C. in an inert atmosphere, generating the polymerization reaction.

The termination of the first polymerization is the point wherein the conversion rate of the dihaloaromatic compound in the reaction system reaches not less than about 50 mol %, not less than about 70 mol %, or not less than about 90 mol % of the theoretical conversion. The theoretical conversion of the dihaloaromatic compound can be calculated from one of the following formulas:

(a) In the case wherein the dihaloaromatic compound (hereinafter referred to as DHA) has been added in excess (by molar ratio) of the alkali metal sulfide:

$$\text{Conversion rate} = \frac{X-Y}{X-Z} \times 100$$

(b) In the cases other than (a):

$$\text{Conversion rate} = \frac{X-Y}{X} \times 100$$

wherein X is the amount of the charged dihaloaromatic compound; Y is the remaining amount of the dihaloaromatic compound and Z is the excessive amount of dihaloaromatic compound in moles.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the starting polyarylene sulfide. The duration of the second polymerization step can be, e.g., from about 0.5 to about 20 hours, or from about 1 to about 10 hours.

The starting polyarylene sulfide may be linear, semi-linear, branched or crosslinked. A linear starting polyarylene sulfide includes as the main constituting unit the repeating unit of —(Ar—S)—. In general, a linear starting polyarylene sulfide may include about 80 mol % or more of this repeating unit. A linear starting polyarylene sulfide may include a small amount of a branching unit or a cross-linking unit, but the amount of branching or cross-linking units may be less than about 1 mol % of the total monomer units of the starting polyarylene sulfide. A linear starting polyarylene sulfide polymer may be a random copolymer or a block copolymer containing the above-mentioned repeating unit.

A semi-linear starting polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear starting polyarylene sulfide are generally known in the art. By way of example, monomer components used in forming a semi-linear starting polyarylene sulfide can include an amount of polyhaloaromatic compounds having 2 or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear starting polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the starting polyarylene sulfide may be washed with liquid media. For instance, the starting polyarylene sulfide may be washed with water, acetone, N-methyl-2-pyrrolidone, a salt solution, and/or an acidic media such as acetic acid or hydrochloric acid prior to combination with other components while forming the mixture. The starting polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A starting polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the starting polyarylene sulfide to a predetermined amount of water and heating the mixture under stirring in a pressure vessel. By way of example, a bath ratio of up to about 200 grams of starting polyarylene sulfide per liter of water can be used. Following the hot water wash, the starting polyarylene sulfide can be washed several times with warm water, maintained at a temperature of from about 10° C. to about 100° C. A wash can be carried out in an inert atmosphere to avoid deterioration of the polymer.

Organic solvents that will not decompose the starting polyarylene sulfide can be used for washing the starting polyarylene sulfide. Organic solvents can include, without limitation, nitrogen-containing polar solvents such as N-methylpyrrolidone, dimethylformamide, dimethylacetamide, 1,3-dimethylimidazolidinone, hexamethylphosporamide, and piperazinone; sulfoxide and sulfone solvents such as dimethyl sulfoxide, dimethylsulfone, and sulfolane; ketone solvents such as acetone, methyl ethyl ketone, diethyl ketone, and acetophenone, ether solvents such as diethyl ether, dipropyl ether, dioxane, and tetrahydrofuran; halogen-containing hydrocarbon solvents such as chloroform, methylene chloride, ethylene dichloride, trichloroethylene, perchloroethylene, monochloroethane, dichloroethane, tetrachloroethane, perchloroethane, and chlorobenzene; alcohol and phenol solvents such as methanol, ethanol, propanol, butanol, pentanol, ethylene glycol, propylene glycol, phenol, cresol, polyethylene glycol, and polypropylene glycol; and aromatic hydrocarbon solvents such as benzene, toluene, and xylene. Further, solvents can be used alone or as a mixture of two or more thereof.

Washing with an organic solvent can be carried out by immersing the starting polyarylene sulfide in the organic solvent and heating or stirring as appropriate. The washing temperature for the organic solvent washing is not particularly critical, and a temperature can generally be from about 20° C. to about 300° C. Washing efficiency can be increased with an elevation of the washing temperature, but in general, a satisfactory effect is obtained at a washing temperature of from about 20° C. to about 150° C.

In one embodiment, washing can be carried out under pressure at a temperature higher than the boiling point of the organic solvent in a pressure vessel. The washing time is not critical, and for a batchwise washing, washing can generally be carried out for about 5 minutes or more. Batchwise washing is not a requirement, however, and the washing can be performed in a continuous manner.

In one embodiment, organic solvent washing can be combined with hot water washing and/or warm water washing. When a high-boiling-point organic solvent such as N-methylpyrrolidone is used, the residual organic solvent can be removed by washing with water or warm water after the organic solvent washing, and distilled water or deionized water can be used for this washing.

The polymerization reaction apparatus is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten starting polyarylene sulfide may be discharged from the reactor, typically through an extrusion orifice fitted with a die of desired configuration, cooled, and collected. Commonly, the starting polyarylene sulfide may be discharged through a perforated die to form strands that are taken up in a water bath, pelletized and dried. The starting polyarylene sulfide may also be in the form of a strand, granule, or powder.

A mixture that is melt processed to form a melt processed polyarylene sulfide composition may include a starting polyarylene sulfide (or a blend of multiple starting polyarylene sulfides) in an amount from about 40 wt. % to about 90 wt. % by weight of the mixture, for instance from about 45% wt. % to about 80 wt. % by weight of the mixture.

A starting polyarylene sulfide polymer or copolymer that is included in a mixture (which can also encompass a blend of one or more starting polyarylene sulfide polymers and/or copolymers) may have a relative high molecular weight. For instance a starting polyarylene sulfide may have a number average molecular weight greater than about 25,000 g/mol, or greater than about 30,000 g/mol, and a weight average molecular weight greater than about 60,000 g/mol, or greater than about 65,000 g/mol. A high molecular weight starting polyarylene sulfide may have a low chlorine content, for instance less than about 1000 ppm, less than about 900 ppm, less than about 600 ppm, or less than about 400 ppm.

In one embodiment, the starting polyarylene sulfide may have a high molecular weight and a high melt viscosity. For instance, the melt viscosity of the starting polyarylene sulfide may be greater than about 2,500 poise, greater than about 3,000 poise, or greater than about 3,500 poise as determined in accordance with ISO Test No. 11443 at a shear rate of 1200 s$^{-1}$ and at a temperature of 310° C.

B. Disulfide Compound

The mixture that is melt processed to form the melt processed polyarylene sulfide composition can include a disulfide compound. In general, the disulfide compound may have the structure of formula (VIII):

$$R^3\text{—S—S—}R^4 \qquad \text{(VIII)}$$

wherein $R^3$ and $R^4$ may be the same or different and are hydrocarbon groups that independently include from 1 to about 20 carbons. For instance, $R^3$ and $R^4$ may be an alkyl, cycloalkyl, aryl, or heterocyclic group.

$R^3$ and $R^4$ may include reactive functionality at terminal end(s) of the disulfide compound. For example, at least one of $R^3$ and $R^4$ may include a terminal carboxyl group, hydroxyl group, a substituted or non-substituted amino group, a nitro group, or the like. Examples of disulfide compounds including reactive terminal groups as may be combined with a starting polyarylene sulfide in forming a mixture for melt processing may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

In one embodiment, the disulfide compound may include nonreactive functionality at terminal end(s). For instance, the $R^3$ and $R^4$ groups may be the same or different and may be nonreactive groups independently selected from the group consisting of alkyl, cycloalkyl, aryl, and heterocyclic groups of 1 to about 20 carbon atoms. Examples of disulfide compounds including nonreactive terminal groups as may be combined with a starting polyarylene sulfide in forming a mixture for melt processing may include, without limitation, diphenyl disulfide, naphthyl disulfide, dimethyl disulfide, diethyl disulfide, and dipropyl disulfide.

The mixture that is melt processed to form the melt processed polyarylene sulfide composition may include the disulfide compound in an amount of from about 0.1 wt. % to about 3 wt. % by weight of the mixture, for instance from about 0.1 wt. % to about 1 wt. % by weight of the mixture.

The ratio of the amount of the starting polyarylene sulfide to the amount of the disulfide compound utilized in forming the mixture can be from about 1000:1 to about 10:1, from about 500:1 to about 20:1, or from about 400:1 to about 30:1. In general, enough of the disulfide compound should be added to the mixture so as to develop the desired melt viscosity of the melt processed polyarylene sulfide composition. However, too much disulfide compound added to the mixture can lead to undesired interaction between the disulfide compound and other components of the mixture during the melt processing.

C. Filler

In addition to the starting polyarylene sulfide and the disulfide component, a filler can be a component of the mixture to be melt processed. The filler may generally be included in the mixture an amount of from about 5 wt. % to about 70 wt. %, or from about 20 wt. % to about 65 wt. % by weight of the mixture.

Beneficially, the filler may be combined with the other components of the mixture rather than in a post-melt processing step as is often found in previously known polyarylene sulfide composition formation techniques. In addition, it is believed that the lower melt viscosity of the melt processed polyarylene sulfide composition obtainable due to interaction between the disulfide compound and the starting polyarylene sulfide may prevent degradation of the fillers during melt processing, maintaining filler size and providing excellent strength characteristics to the melt processed polyarylene sulfide composition.

In one embodiment, the filler can be a fibrous filler. The fibers are typically of a length from about 0.5 mm to about 5.0 mm. The fibrous filler may include one or more fiber types including, without limitation, polymer fibers, glass fibers, carbon fibers, metal fibers, and so forth, or a combination of fiber types. In one embodiment, the fibers may be chopped glass fibers or glass fiber rovings (tows).

Fiber diameters can vary depending upon the particular fiber used and are available in either chopped or continuous form. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm.

Fiber lengths can vary. In one embodiment, the fibers can have an initial length of from about 3 mm to about 5 mm. The melt processing conditions due to the combination of the disulfide compound with the starting polyarylene sulfide in the mixture can prevent excessive degradation of the added fibers and as a result the fibers can show less attrition during melt processing of the mixture. For instance, the final fiber length in the melt processed polyarylene sulfide composition can vary from about 200 μm to about 1500 μm, or from about 250 μm to about 1000 μm.

The fibers may be pretreated with a sizing that may also facilitate mixing with the starting polyarylene sulfide during melt processing of the mixture.

In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the polyarylene sulfide composition. In general, particulate fillers can encompass any particulate material having a median particle size of less than about 750 μm, for instance less than about 500 μm, or less than about 100 μm. In one embodiment, a particulate filler can have a median particle size in the range of from about 3 μm to about 20 μm. In addition, a particulate filler can be solid or hollow, as is known. Particulate fillers can also include a surface treatment, as is known in the art.

When incorporating multiple fillers, for instance a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

When employed, such mineral fillers typically constitute from about 5 wt. % to about 60 wt. %, in some embodiments from about 10 wt. % to about 50 wt. %, and in some embodiments, from about 15 wt. % to about 45 wt. % of the fibers. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), Mite (($K,H_3O)(Al,Mg,Fe)_2$ $(Si,Al)_4O_{10}[(OH)_2,(H_2O)])$, montmorillonite ($Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_2$-$3(AlSi_3)O_{10}(OH)_2$), glauconite ($K,Na)(Al,Mg,Fe)_2(Si,Al)_4O_{10}(OH)_2$), etc., as well as combinations thereof.

D. Other Additives

In addition to the starting polyarylene sulfide, the disulfide compound and the filler, other additives as are generally known in the art may be included in the mixture.

In one embodiment, the mixture can include an organosilane coupling agent. Without wishing to be bound by any particular theory, it is believed that interaction between the disulfide compound and an organosilane coupling agent may enhance the benefits of the filler in a melt processed polyarylene sulfide composition.

The organosilane coupling agent may be an alkoxy silane coupling agent as is known in the art. The alkoxysilane compound may be a silane compound selected from the group consisting of vinylalkoxysilanes, epoxyalkoxysilanes, aminoalkoxysilanes, mercaptoalkoxysilanes, and combinations thereof. Examples of the vinylalkoxysilane that may be utilized include vinyltriethoxysilane, vinyltrimethoxysilane and vinyltris(β-methoxyethoxy)silane. Examples of the epoxyalkoxysilanes that may be used include γ-glycidoxypropyltrimethoxysilane, β-(3,4-epoxycyclohexyl)ethyltrimethoxysilane and γ-glycidoxypropyltriethoxysilane. Examples of the mercaptoalkoxysilanes that may be employed include γ-mercaptopropyltrimethoxys lane and γ-mercaptopropyltriethoxysilane.

Amino silane compounds that may be included in the mixture are typically of the formula: $R^5$—Si—$(R^6)_3$, wherein $R^5$ is selected from the group consisting of an amino group such as $NH_2$; an aminoalkyl of from about 1 to about 10 carbon atoms, or from about 2 to about 5 carbon atoms, such as aminomethyl, aminoethyl, aminopropyl, aminobutyl, and so forth; an alkene of from about 2 to about 10 carbon atoms, or from about 2 to about 5 carbon atoms, such as ethylene, propylene, butylene, and so forth; and an alkyne of from about 2 to about 10 carbon atoms, or from about 2 to about 5 carbon atoms, such as ethyne, propyne, butyne and so forth; and wherein $R^6$ is an alkoxy group of from about 1 to about 10 atoms, or from about 2 to about 5 carbon atoms, such as methoxy, ethoxy, propoxy, and so forth.

In one embodiment, $R^5$ is selected from the group consisting of aminomethyl, aminoethyl, aminopropyl, ethylene, ethyne, propylene and propyne, and $N^6$ is selected from the group consisting of methoxy groups, ethoxy groups, and propoxy groups. In another embodiment, $R^5$ is selected from the group consisting of an alkene of from about 2 to about 10 carbon atoms such as ethylene, propylene, butylene, and so forth, and an alkyne of from about 2 to about 10 carbon atoms such as ethyne, propyne, butyne, and so forth, and $R^6$ is an alkoxy group of from about 1 to about 10 atoms, such as methoxy group, ethoxy group, propoxy group, and so forth. A combination of various aminosilanes may also be included in the mixture.

Some representative examples of amino silane coupling agents that may be included in the mixture include aminopropyl triethoxy silane, aminoethyl triethoxy silane, aminopropyl trimethoxy silane, aminoethyl trimethoxy silane, ethylene trimethoxy silane, ethylene triethoxy silane, ethyne trimethoxy silane, ethyne triethoxy silane, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl)tetramethoxy silane, bis(3-aminopropyl)tetraethoxy disiloxane, and combinations thereof. The amino silane may also be an aminoalkoxysilane, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. One suitable amino silane is 3-aminopropyltriethoxysilane which is available from Degussa, Sigma Chemical Company, and Aldrich Chemical Company.

When included, the mixture may include the organosilane coupling agent in an amount from about 0.1 wt. % to about 5 wt. % by weight of the mixture, from about 0.3 wt. % to about 2 wt. % by weight of the mixture, or from about 0.2 wt. % to about 1 wt. % by weight of the mixture.

An impact modifier may be included in the mixture that is melt processed. In one embodiment, the impact modifier may comprise a random copolymer of polyethylene and glycidyl methacrylate. The amount of glycidyl methacrylate contained in the random copolymer may vary. In one particular embodiment, the random copolymer contains the glycidyl methacrylate in an amount from about 6% to about 10% by weight of the copolymer.

Other impact modifiers as may be utilized include polyurethanes, two-phase mixtures of polybutadiene and styreneacrylonitrile (ABS), modified polysiloxanes or silicone rubbers, or graft copolymers of an elastomeric, single-phase core based on polydiene and of a hard graft shell (core-shell structure).

When considering graft copolymer impact modifiers, the impact modifiers are composed of particles most of which, for instance more than 70% of which, have a structure composed of a core and one or more shells. The core can be formed from an elastomeric polymer phase onto which has been grafted the hard shell, which may be composed of two or more layers. The core is generally a single-phase of the elastomeric soft phase and includes only small amounts of, if any, hard polymer constituents of the shell. The graft copolymer can be composed of from 40 to 95% by weight, from 60 to 90% by weight, or from 70 to 80% by weight, of the elastomeric core. The proportion of the shells can be from 5 to 60% by weight, from 10 to 40% by weight, or from 20 to 30% by weight.

Other impact modifiers encompassed herein include polyurethanes, e.g., thermoplastic polyurethanes. Polyurethane impact modifiers are prepared in a known manner via polyaddition of polyisocyanates, in particular diisocyanates, polyesters, polyethers, polyesteramides, polyacetals, or other suitable hydroxy or amino compounds, e.g. hydroxylated polybutadiene, or mixtures of the abovementioned compounds. Where appropriate, use is also made of chain extenders, such as low-molecular-weight polyols, in particular diols, polyamines, in particular diamines, or water.

Still other additives that can be included in the mixture can encompass, without limitation, antimicrobials, pigments, lubricants, antioxidants, stabilizers, surfactants, waxes, flow promoters, solid solvents, and other materials added to enhance properties and processability. Such optional materials may be employed in mixture in conventional amounts.

III. Melt Processing Techniques

The mixture including the starting polyarylene sulfide, the disulfide compound, and a filler may be formed prior to addition of the mixture to the melt processing device or system. Alternatively, individual components may be added to the melt processing device or system, thereby forming the mixture in conjunction with the melt processing.

The mixture may be melt processed according to techniques known in the art. For example, the mixture may be melt-kneaded in a single-screw or multi-screw extruder at a temperature of from about 250° C. to about 320° C. In one embodiment, the mixture may be melt processed in an extruder that includes multiple temperature zones. For instance, the mixture may be melt processed in an extruder that includes a temperature zone that is maintained at a temperature of between about 250° C. and about 320° C.

By way of example, a mixture including the starting polyarylene sulfide, the disulfide compound, and the filler may be melt mixed using a twin screw extruder such as a Leistritz 18 mm co-rotating fully intermeshing twin screw extruder. An extruder may have multiple temperature control zones, e.g., about 6 temperature control zones (including at the extrusion die), and an overall L/D of 30. A general purpose screw design can be used to melt process the mixture. In one embodiment, the mixture including all of the components may be fed to the feed throat in the first barrel by means of a volumetric feeder. In another embodiment, different components may be added at different addition points in the extruder, as is known. The mixture can be melted and mixed then extruded through a die. The extruded melt processed polyarylene sulfide composition can then be quenched in a water bath to solidify and granulated in a pelletizer followed by drying, e.g., drying at about 120° C.

IV. Products

Conventional shaping processes for forming articles out of a melt processed polyarylene sulfide composition include, without limitation, extrusion, injection molding, blow-molding, thermoforming, foaming, compression molding, hot-stamping, fiber spinning and so forth. Shaped articles that may be formed may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays.

A melt processed polyarylene sulfide composition can be used in a variety of electrical and electronics applications in which a low chlorine content is desirable. For instance, utilization of a melt processed polyarylene sulfide composition in the formation of connectors and over-molding (insert-molding) parts is encompassed. The low melt viscosity, low chlorine content melt processed polyarylene sulfide compositions are beneficial in a variety of connector applications.

The melt processed polyarylene sulfide compositions also exhibit good thermal properties that make them excellent materials for high temperature applications. For example, the high DTUL of the melt processed polyarylene sulfide compositions make them excellent candidates for lead-free soldering processing and also beneficial for insert-molding parts, for instance those that may undergo high temperature painting processes.

Figure 2:
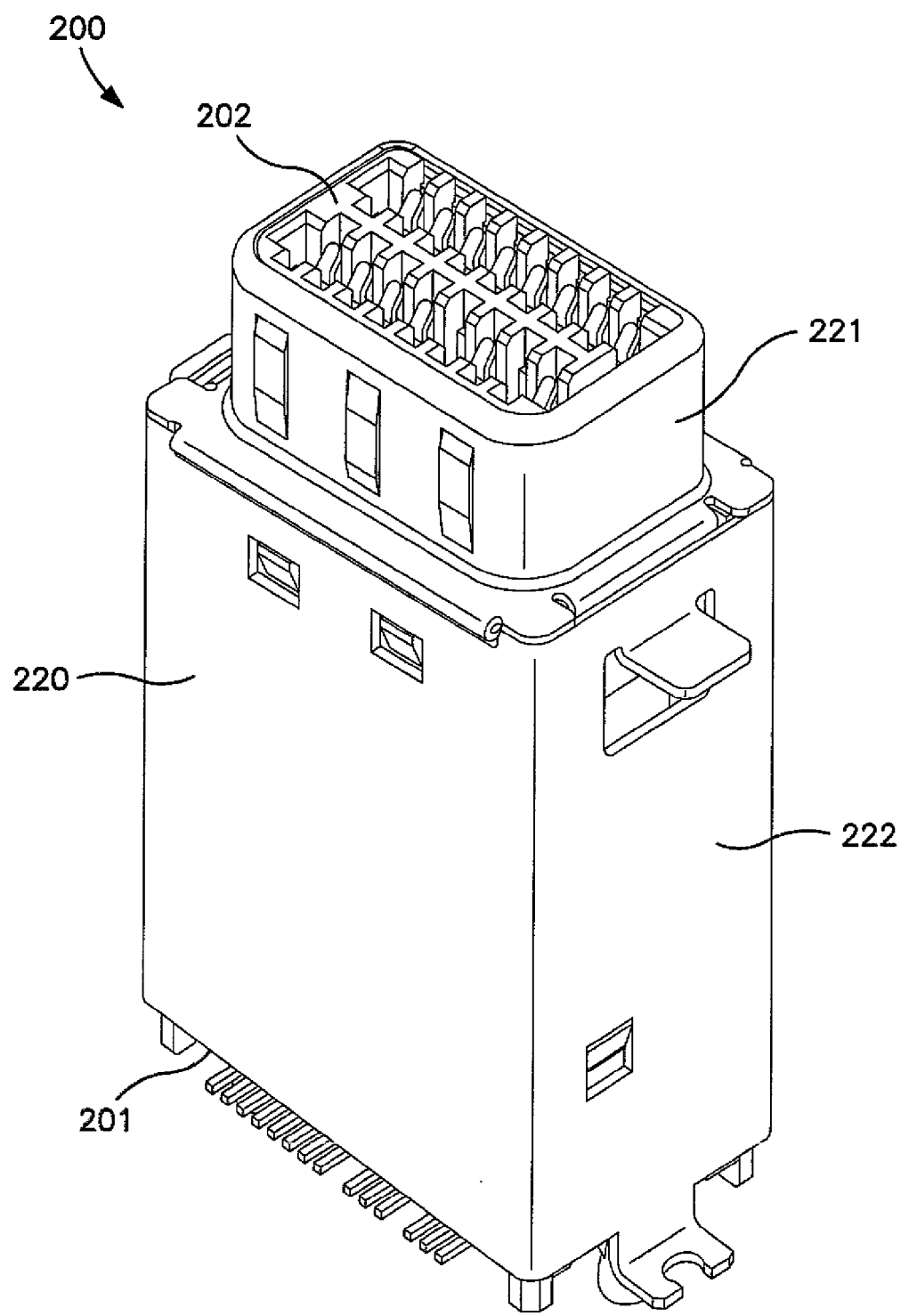
FIG. 2 is the electrical connector of FIG. 1 as formed.

According to one embodiment, a melt processed polyarylene sulfide composition can be utilized in forming an electrical connector. Referring to FIGS. 1-2, an electrical connector 200, for instance as may be utilized for mounting to a printed circuit board (not shown) or connecting an external component to a computer can be formed. Electrical connector 200 includes an insulative housing 210, a plurality of contact modules 230 inserted into the insulative housing 210, and a shield 220 that encloses the insulative housing 210. The electrical connector 200 is straight and defines a mounting face 201 and a mating face 202 opposite to the mounting face 201. It should be understood, however, that the specific geometry of an electrical connector that incorporates a melt processed polyarylene sulfide composition as described herein is not in any way limited to the embodiment of FIG. 1.

The insulative housing 210 and the shield 220 can each be a one-piece structure unitarily molded of a melt processed polyarylene sulfide composition and can be the same or different from one another. The shield 220 can be a two-piece structure which includes a first shell 221 and a second shell 222, and each shell can be formed of the same or different melt processed polyarylene sulfide composition as described herein. The insulative housing 210 has a base portion 211 and a rectangular mating port 212 extending upwardly from the base portion 211 for mating with a complementary plug (not shown) in an up to down direction. The base portion 211 defines a downwardly facing longitudinal cavity for receiving the plurality of contact modules 230 therein. The mating port 212 of the insulative housing 210 has a front wall 321, a back wall 322 parallel to the front wall 321, and a pair of sidewalls 323 connected the front and the back wall 321, 322. The mating port 212 includes a tongue plate 224 parallel to the front and back wall 321, 322 and extending therebetween. Passageways 225 allow for contact between the contact modules 230 and the device to which the electrical connector can connect.

The melt processed polyarylene sulfide compositions are useful to form an overmolding that includes a coating of the melt processed polyarylene sulfide composition on a metal body. The metal body may be any one of various metal bases or a metal base with an undercoat formed in advance with an inorganic material and/or an organic material.

The metal base material can include, without limitation, aluminum, iron, titanium, chromium, nickel, and alloys containing at least one of these metals, for example, duralumin, carbon steel and stainless steel can provide heat resistance, corrosion resistance, adhesion properties, mechanical characteristics, economy and the like.

The overmolding can be formed by providing at least one coating layer of a melt processed polyarylene sulfide composition on a metal base. By way of example, the coating process can include a pretreatment of a metal base that is conducted prior to the formation of the coating layer. A pretreatment can improve adhesion between the metal base and the coating layer. Pretreatment generally includes cleaning, surface roughening or surface modification, or a combination thereof.

Cleaning can be carried out with a detergent, a solvent, an acid or an alkali, or a removal treatment of rust or burrs with a derusting agent, by a physical method (sand blasting, honing or the like) or a high-temperature heating treatment. Surface roughening can be, e.g., a chemical roughening treatment with an oxidizing agent, electrolytic oxidation or a physical method such as sand blasting. Surface modification can improve the adhesion of the metal base to the coating layer. It can be include a surface oxidation treatment (e.g., with an oxidizing agent, or by electrolytic oxidation or high-temperature oxidation), a surface-nitriding treatment, or a surface-hydroxylating treatment (by steaming).

Optionally, an undercoat may be applied, for instance to reduce the difference in the coefficient of linear expansion between the metal base and the coating layer, to improve the adhesion between the metal base and the coating layer, and to prevent corrosion of the metal base upon its coating treatment. When included, an undercoat may include inorganic material layers such as ceramic layers, glass layers and cermet layers as well as layers of the same kind as the coating layer or of a kind different from the coating layer. Methods for coating may include, without limitation, slurry coating, powder coating, fluidized bed coating and electrostatic coating.

Following pretreatment and formation of any undercoat layer(s), a melt processed polyarylene sulfide composition can be coated on the metal base to form a coating layer. The coating layer can be formed according to any standard coating method as is generally known in the art including, without limitation, slurry coating, powder coating, fluidized bed coating and electrostatic coating.

Depending on the application purpose of the overmolding, a coating layer of a kind different from the layer of the melt processed polyarylene sulfide composition and any undercoat may be applied additionally as an intermediate coating layer or a topcoat. For instance, a topcoat of a fluoroplastic or fluorinated polymer composition can be formed on the melt processed polyarylene sulfide composition coating layer.

An overmolding may be used in a wide variety of applications, such as components for automobiles, trucks, commercial airplanes, aerospace, rail, household appliances, computer hardware, hand held devices, recreation and sports, structural component for machines, structural components for buildings, etc.

Wireless electronic devices are particularly suitable for incorporation of a melt processed polyarylene sulfide composition as disclosed herein. For example, the overmolding may serve as a housing for a wireless electronic device. In such embodiments, an antenna may be disposed on and/or within the metal component prior to overmolding. The metallic component itself may also be used as part of the antenna. For example, portions of the metal component may be shorted together to form a ground plane in or to expand a ground plane structure that is formed from a planar circuit structure, such as a printed circuit board structure (e.g., a printer circuit board structure used in forming antenna structures). Alternatively, the antenna may also be embedded within the melt processed polyarylene sulfide composition during the molding process. Other discrete components can also be embedded within the melt processed polyarylene sulfide composition, such as metal stampings, bushings, electromechanical parts, filtration materials, metal reinforcement and other discrete parts that are combined into a single unitary component through the injection of thermoplastic around the carefully placed parts.

Examples of suitable wireless electronic devices may include a desktop computer or other computer equipment, a portable electronic device, such as a laptop computer or small portable computer of the type that is sometimes referred to as "ultraportables." In one suitable arrangement, the portable electronic device may be a handheld electronic device. Examples of portable and handheld electronic devices may include cellular telephones, media players with wireless communications capabilities, handheld computers (also sometimes called personal digital assistants), remote controls, global positioning system ("GPS") devices, and handheld gaming devices. The device may also be a hybrid device that combines the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, has music player functionality and supports web browsing.

Figure 3:
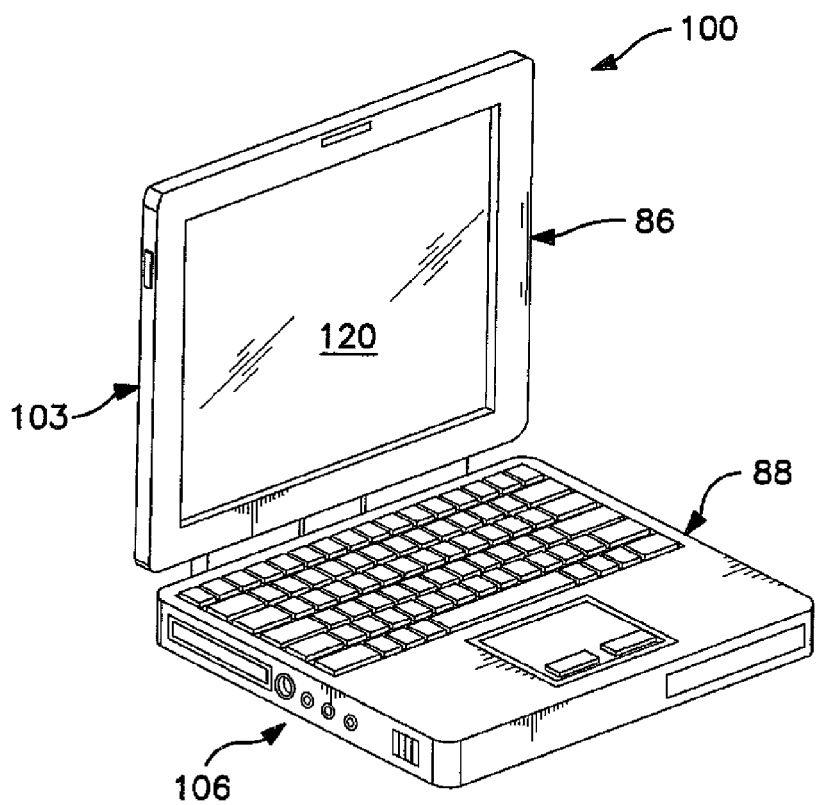
FIG. 3 is a perspective view of an electronic device that contains an overmolding that includes a melt processed polyarylene sulfide composition in accordance with one embodiment of the present disclosure.
Figure 4:
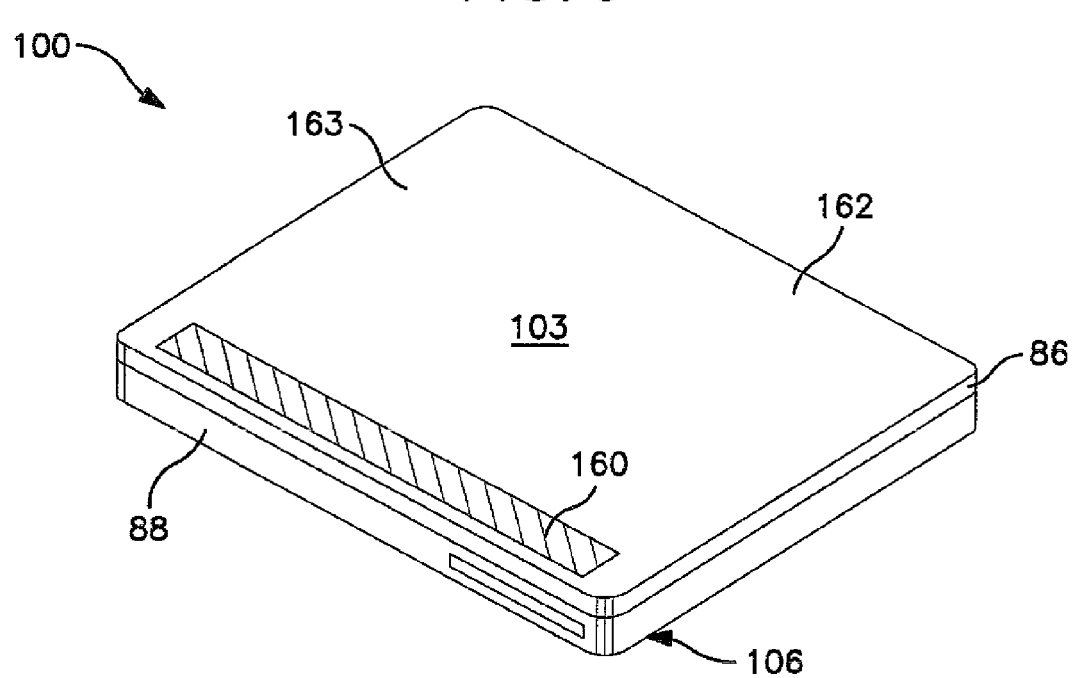
FIG. 4 is a perspective view of the electronic device of FIG. 3, shown in a closed configuration.

Referring to FIGS. 3-4, one particular embodiment of a wireless electronic device 100 is shown as a laptop computer. The electronic device 100 includes a display member 103 rotatably coupled to a base member 106. The display member 103 may be a liquid crystal diode (LCD) display, an organic light emitting diode (OLED) display, a plasma display, or any other suitable display. The display member 103 and the base member 106 each contain a housing 86 and 88, respectively, for protecting and/or supporting one or more components of the electronic device 100. The housing 86 may, for example, support a display screen 120 and the base member 106 may include cavities and interfaces for various user interface components (e.g. keyboard, mouse, and connections to other peripheral devices).

The overmolding may generally be employed to form any portion of the electronic device 100. In most embodiments, however, the overmolding is employed to form all or a portion of the housing 86 and/or 88. For example, the housing 86 shown in FIG. 3 is formed from the overmolding and contains a melt processed polyarylene sulfide composition 160 adhered to an interior surface (not shown) of a metal component 162. In this particular embodiment, the melt processed polyarylene sulfide composition 160 is in the form of a strip, which may optionally cover an antenna (not shown) located in the housing 86. Of course, the antenna and/or melt processed polyarylene sulfide composition 160 may be disposed at other location of the housing 86, such as adjacent to a corner, along an edge, or in any other suitable position. Regardless, the resulting overmolding formed with the melt processed polyarylene sulfide composition 160 and the metal component 162 defines an exterior surface 163 of the housing 86. The exterior surface 163 is generally smooth, and is indicated above, has a similar color and visual appearance.

Although not expressly shown, the device 100 may also contain circuitry as is known in the art, such as storage, processing circuitry, and input-output components. Wireless transceiver circuitry in circuitry may be used to transmit and receive radio-frequency (RF) signals. Communications paths such as coaxial communications paths and microstrip communications paths may be used to convey radio-frequency signals between transceiver circuitry and antenna structures. A communications path may be used to convey signals between the antenna structure and circuitry. The communications path may be, for example, a coaxial cable that is connected between an RF transceiver (sometimes called a radio) and a multiband antenna.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Test Methods

Melt Viscosity: The melt viscosity is reported as scanning shear rate viscosity. Scanning shear rate viscosity as reported herein was determined in accordance with ISO Test No. 11443 (technically equivalent to ASTM D3835) at a shear rate of 1200 s$^{-1}$ and at a temperature of 310° C. using a Dynisco 7001 capillary rheometer. The rheometer orifice (die) had a diameter of 1 mm, a length of 20 mm, an L/D ratio of 20.1, and an entrance angle of 180°. The diameter of the barrel was 9.55 mm±0.005 mm and the length of the rod was 233.4 mm.

Tensile Modulus, Tensile Stress, and Tensile Elongation: Tensile properties were tested according to ISO Test No. 527 (technically equivalent to ASTM D638). Modulus and strength measurements were made on the same test strip sample having a length of 80 mm, thickness of 10 mm, and width of 4 mm. Testing temperature was 23° C., and testing speed was 5 mm/min.

Flexural Modulus, Flexural Stress, and Flexural Strain: Flexural properties were tested according to ISO Test No. 178 (technically equivalent to ASTM D790). This test was performed on a 64 mm support span. Tests were run on the center portions of uncut ISO 3167 multi-purpose bars. Testing temperature was 23° C., and testing speed was 2 mm/min.

Izod Notched Impact Strength: Notched Izod properties were tested according to ISO Test No. 80 (technically equivalent to ASTM D256). This test was run using a Type A notch. Specimens were cut from the center of a multi-purpose bar using a single tooth milling machine. Testing temperature was 23° C.

Deflection Under Load Temperature ("DTUL"): The deflection under load temperature was determined in accordance with ISO Test No. 75-2 (technically equivalent to ASTM D648-07). A test strip sample having a length of 80 mm, thickness of 10 mm, and width of 4 mm was subjected to an edgewise three-point bending test in which the specified load (maximum outer fibers stress) was 1.8 MPa. The specimen was lowered into a silicone oil bath where the temperature is raised at 2° C. per minute until it deflects 0.25 mm (0.32 mm for ISO Test No. 75-2).

Chlorine Content: Chlorine content was determined according to an elemental analysis analysis using Parr Bomb combustion followed by Ion Chromatography.

Fiber length: Starting fiber lengths were as reported from the fiber source. Final fiber lengths were reported as average fiber length and were determined by use of a scanning electron microscope.

Example 1

Samples were formed in an extrusion process as follows.

The components as described below were mixed in a Werner Pfleiderer ZSK 25 co-rotating intermeshing twin-screw extruder with a 25 mm diameter. Samples were molded on a Mannesmann Demag D100 NCIII injection molding machine.

Materials utilized included the following:
Lubricant—Glycolube® P (pentaerythritol tetrastearate) available from
Lonza, Inc. of Allendale, N.J.
Nonfunctional Disulfide—diphenyl disulfide.
Functional Disulfide—2,2'-dithiobenzoic acid.
Aminosilane Coupling Agent—3-aminopropyltrimethoxysilane (KBM-903) available from Shin-etsu Silicone.
Mercaptosilane Coupling Agent—3-mercaptopropyltrimethoxysilane.
Dynasylan® MTMO available from Evonik-Silanes.
Mineral Filler—Suzorite®200-HK mica available from lmerys Performance Minerals.
Glass Fiber—Fiber glass 910A-10C 4 mm, available from Owens Corning, Inc.
Polyarylene Sulfide—Fortron®0214 polyphenylene sulfide available from
Ticona Engineering Polymers.

The specific formulation for each tested material is provided in Table 1, below.

TABLE 1

| Sample No. | 001 | 002 | 003 | 004 | 005 | 006 |
|---|---|---|---|---|---|---|
| Lubricant | 0.3% | 0.3% | 0.3% | 0.3% | 0.3% | 0.3% |
| Nonfunctional Disulfide | | | 0.4% | 0.2% | 0.2% | |
| Functional Disulfide | | | | | | 0.2% |
| Aminosilane coupling agent | | 0.4% | | 0.2% | | 0.2% |
| Mercaptosilane coupling agent | | | | | 0.2% | |
| Suzorite mica | 30% | 30% | 30% | 30% | 30% | 30% |
| Glass fiber | 20.0% | 20.0% | 20.0% | 20.0% | 20.0% | 20.0% |
| PAS | 49.7% | 49.3% | 49.3% | 49.3% | 49.3% | 49.3% |
| Total | 100% | 100% | 100% | 100% | 100% | 100% |

The extruded pellets were tested for ash content and viscosity, with results described in Table 2, below.

TABLE 2

| Sample No. | 001 | 002 | 003 | 004 | 005 | 006 |
|---|---|---|---|---|---|---|
| Ash % | 49.86 | 50.00 | 49.81 | 49.71 | 48.44 | 48.25 |
| Melt viscosity (poise) | 2747 | 3587 | 764 | 1160 | 1342 | 2434 |

The pellets were injection molded and tested for certain physical characteristics, as described in Table 3, below.

TABLE 3

| Sample No. | 001 | 002 | 003 | 004 | 005 | 006 |
|---|---|---|---|---|---|---|
| Tensile Modulus (MPa) | 16237 | 17176 | 16936 | 17740 | 16182 | 16542 |
| Tensile stress (MPa) | 106.00 | 129.11 | 114.92 | 128.19 | 124.07 | 122.45 |
| Tensile elongation (%) | 1.24 | 1.15 | 1.25 | 1.22 | 1.24 | 1.25 |
| Flexural Modulus 23° C. (MPa) | 15996 | 16562 | 16915 | 16778 | 16372 | 16752 |
| Flexural Stress (MPa) | 173.14 | 196.75 | 176.5 | 192.4 | 186.4 | 188.9 |
| Flexural Strain (%) | 1.47 | 1.44 | 1.33 | 1.40 | 1.37 | 1.37 |
| Izod Notched Impact Strength (kJ/m$^2$) | 4.7 | 4.5 | 4.2 | 4.2 | 5.2 | 4.7 |
| DTUL at 1.8 MPa (° C.) | 250.7 | 252.9 | 265 | 262.8 | 266.4 | 257.4 |
| Chlorine content (ppm) | 790 | 500 | 550 | 640 | 810 | 920 |
| Fiber length (mm) | 0.20 | 0.20 | 0.24 | 0.22 | — | — |

A high molecular weight starting polyphenylene sulfide (Mn=29989, Mw=65245, polydispersity (PDI)=2.18) was utilized in all formulations to obtain low chlorine compounds. In the sample that did not include either the disulfide additive or the silane additive (Sample 001), mechanical properties including tensile modulus and flexural modulus as well as thermal properties (deflection temperature under load) were poor.

When the silane additive was included, without the disulfide additive (Sample 002), the mechanical properties improved somewhat. However, the deflection temperature under load was still poor because the melt viscosity of the sample was high and this caused glass fiber abrasion (shorter glass fiber length). Such a high melt viscosity may cause processing issues for certain applications.

When the disulfide compound alone was added, without the silane additive (Sample 003), the deflection temperature under load was improved, but the mechanical properties were still poor.

The properties of the sample that included both the disulfide and silane additives (Sample 004) can be seen as having both improved mechanical properties and thermal properties as measured by deflection temperature under load while still maintaining a good melt viscosity for processing.

The utilization of a mercapto silane coupling agent (Sample 005) provided a sample with a higher Izod Notched strength and deflection temperature under load while still maintaining a good melt viscosity for processing.

The composition including the functional disulfide compound (Sample 006) has a slightly higher melt viscosity, due to the coupling reaction between organosilane and the functionality of the disulfide compound, though the melt viscosity is still processable, with good strength and thermal characteristics.

Example 2

Samples were formed in an extrusion process as described in Example 1.

The specific formulation of for each tested material is provided in Table 4, below. The high molecular weight starting polyarylene sulfide was Fortron®0214 polyphenylene sulfide available from Ticona Engineering Polymers, described in Example 1. The low molecular weight starting polyarylene sulfide was Fortran®0205 polyphenylene sulfide available from Ticona Engineering Polymers (Mn=23944, Mw=50945, PDI=2.13). The other components were as described in Example 1.

TABLE 4

| Sample No. | 007 | 008 |
|---|---|---|
| Lubricant | 0.3% | 0.3% |
| Nonfunctional Disulfide | | 0.2% |
| Silane coupling agent | 0.4% | 0.4% |
| Glass fiber | 40% | 40% |
| PAS Low Mw | 59.3% | |
| PAS High Mw | | 59.1% |
| Total | 100% | 100% |

The extruded pellets were tested for ash content and melt viscosity, with results summarized in Table 5.

TABLE 5

| Sample No. | 007 | 008 |
|---|---|---|
| Ash % | 40.81 | 40.57 |
| Melt viscosity | 2592 | 2537 |

The samples were injection molded and tested for certain properties as summarized in Table 6.

TABLE 6

| Sample No. | 007 | 008 |
|---|---|---|
| Tensile Modulus (MPa) | 15736 | 15233 |
| Tensile stress (MPa) | 194 | 199 |

TABLE 6-continued

| Sample No. | 007 | 008 |
|---|---|---|
| Tensile elongation (%) | 1.58 | 1.90 |
| Flexural Modulus 23° C. (MPa) | 14625 | 14254.00 |
| Flexural Stress (MPa) | 278 | 285.00 |
| Flexural Strain (%) | 2.01 | 2.21 |
| Izod Notched Impact Strength (kJ/m$^2$) | 9.8 | 9.30 |
| Chlorine content (ppm) | 1400 | 680 |

As can be seen with reference to Table 6, the inclusion of the disulfide provided a sample with good mechanical properties, and a lower chlorine content than the sample formed from the low molecular weight starting polyarylene sulfide.

Example 3

Samples were formed in an extrusion process as described in Example 1.

The specific formulation of for each tested material is provided in Table 7, below. The high molecular weight starting polyarylene sulfide was Fortron®0214 polyphenylene sulfide available from Ticona Engineering Polymers, described in Example 1. The low molecular weight starting polyarylene sulfide was Fortron®0202 polyphenylene sulfide available from Ticona Engineering Polymers (Mn=16090, Mw=35870, PDI=2.23). The impact modifier was Lotador® AX-8840 EGMA copolymer available from Arkema, Inc. The disulfide compound was 2,2'-dithiobenzoic acid. The other components were as described in Example 1.

TABLE 7

| Sample No. | 009 | 010 | 011 |
|---|---|---|---|
| Lubricant | 0.3% | 0.3% | 0.3% |
| Functional Disulfide | | 0.3% | |
| Nonfunctional Disulfide | | | 0.3% |
| Impact modifier | 8% | 8% | 8% |
| Glass fiber | 30% | 30% | 30% |
| PAS Low Mw | 61.7% | | |
| PAS High Mw | | 61.4% | 61.4% |
| Total | 100% | 100% | 100% |

The extruded pellets were tested for ash content and melt viscosity, with results summarized in Table 8.

TABLE 8

| Sample No. | 009 | 010 | 011 |
|---|---|---|---|
| Ash % | 30.34 | 30.21 | 30.31 |
| Melt viscosity | 1094 | 2746 | 2228 |

The samples were injection molded and tested for certain properties with results summarized in Table 9.

TABLE 9

| Characteristic | 009 | 010 | 011 |
|---|---|---|---|
| Tensile Modulus (MPa) | 9800 | 9550 | 9463 |
| Tensile stress (MPa) | 137.00 | 137.00 | 124.00 |
| Tensile elongation (%) | 1.90 | 2.28 | 1.80 |
| Flexural Modulus 23° C. (MPa) | 9000 | 8857.00 | 9083.00 |
| Flexural Stress (MPa) | 200.00 | 201.00 | 172.00 |
| Flexural Strain (%) | 2.49 | 2.59 | 2.12 |

TABLE 9-continued

| Characteristic | 009 | 010 | 011 |
|---|---|---|---|
| Izod Notched Impact Strength (kJ/m²) | 10 ± 0.4 | 10.90 ± 0.90 | 9.70 ± 0.50 |
| Chlorine content (ppm) | 1500 | 570 | 920 |

The addition of the functional disulfide additive into the glass-filled formulation showed improvement in both impact strength and tensile elongation. The crosslinking reaction between the functional disulfide and the EGMA-type impact modifier contributed to an increase in melt viscosity, though the melt viscosity is still suitable for melt processing.

While certain representative embodiments and details have been shown for the purpose of illustrating the subject invention, it will be apparent to those skilled in this art that various changes and modifications may be made therein without departing from the scope of the subject invention.

What is claimed is:

1. A method for forming a melt processed polyarylene sulfide composition comprising:
melt processing a mixture to form the melt processed polyarylene sulfide composition, the mixture comprising a starting polyarylene sulfide, a filler, an organosilane coupling agent, and a disulfide compound;
wherein the melt processed polyarylene sulfide composition has a melt viscosity of less than about 2000 poise as determined in accordance with ISO Test No. 11443 at a shear rate of 1200 s$^{-1}$ and at a temperature of 310° C., wherein the ratio of the melt viscosity of the starting polyarylene sulfide to the melt viscosity of the melt processed polyarylene sulfide composition is greater than about 1.25, and wherein the melt processed polyarylene sulfide composition has a chlorine content of less than about 1000 ppm.

2. The method according to claim 1, wherein the disulfide compound comprises the following structure:

wherein R$^3$ and R$^4$ are the same or different and are non-reactive groups independently selected from the group consisting of alkyl, cycloalkyl, aryl, and heterocyclic groups, wherein R$^3$ and R$^4$ independently comprise from 1 to about 20 carbon atoms.

3. The method according to claim 1, wherein the starting polyarylene sulfide has a viscosity of greater than about 2500 poise.

4. The method according to claim 1, wherein the organosilane coupling agent is a mercaptosilane or an aminoalkoxy silane.

5. The method according to claim 1, wherein the filler comprises a fibrous filler.

6. The method according to claim 4, wherein the fibrous filler comprises glass fibers, polymer fibers, carbon fibers, metal fibers, or a combination thereof.

7. The method according to claim 1, wherein the filler comprises a particulate filler.

8. The method according to claim 6, wherein the particulate filler is a mineral filler.

9. The method according to claim 1, wherein the starting polyarylene sulfide is a polyphenylene sulfide.

10. The method according to claim 1, wherein the starting polyarylene sulfide is a linear polyarylene sulfide.

11. The method according to claim 1, wherein the mixture comprises between about 40 wt. % and about 90 wt. % of the starting polyarylene sulfide by weight of the mixture, between about 0.1 wt. % and about 3 wt. % of the disulfide compound by weight of the mixture, and between about 5 wt. % and about 70 wt. % of the filler by weight of the mixture.

12. The method according to claim 1, wherein the ratio of the amount of the starting polyarylene sulfide to the amount of the disulfide compound utilized to form the mixture is from about 1000:1 to about 10:1.

13. The method according to claim 1, wherein the melt processing takes place in an extruder, the extruder including a temperature zone that is maintained at a temperature of between about 250° C. and about 320° C.

14. The method according to claim 1, the mixture further including an impact modifier.

15. A melt processed polyarylene sulfide composition comprising:
a polyarylene sulfide;
a disulfide compound;
an organosilane coupling agent; and
a filler;
wherein the melt processed polyarylene sulfide composition has a melt viscosity of less than about 2000 poise as determined in accordance with ISO Test No. 11443 at a shear rate of 1200 s$^{-1}$ and at a temperature of 310° C., wherein the melt viscosity of the melt processed polyarylene sulfide composition is lower than the melt viscosity of the polyarylene sulfide as determined in accordance with ISO Test No. 11443 at a shear rate of 1200 s$^{-1}$ and at a temperature of 310° C., wherein the melt processed polyarylene sulfide composition has a chlorine content of less than about 1000 ppm, and wherein the melt processed polyarylene sulfide composition has a deflection temperature under load of greater than about 200° C. as determined in accordance with ISO Test No. 75-2 at a load of 1.8 MPa.

16. The melt processed polyarylene sulfide composition according to claim 15, wherein the filler is a fibrous filler.

17. The melt processed polyarylene sulfide composition according to claim 15, wherein the fibrous filler comprises glass fibers, polymer fibers, carbon fibers, metal fibers, or a combination thereof.

18. The melt processed polyarylene sulfide composition according to claim 14, wherein the filler comprises a particulate filler.

19. The melt processed polyarylene sulfide composition according to claim 17, wherein the particulate filler is a mineral filler.

20. The melt processed polyarylene sulfide composition according to claim 14, wherein the melt processed polyarylene sulfide composition has a chlorine content of less than about 900 ppm.

21. The melt processed polyarylene sulfide composition according to claim 14, wherein the melt processed polyarylene sulfide composition has a tensile stress of greater than about 120 MPa as determined according to ISO Test No. 527 at a temperature of 23° C. and at a test speed of 5 min/min, and a deflection temperature under load of greater than about 230° C. as determined in accordance with ISO Test No. 75-2 at a load of 1.8 MPa.

22. The melt processed polyarylene sulfide composition according to claim 14, wherein the melt processed polyarylene sulfide composition further comprises an impact modifier.

23. An electrical connector comprising the melt processed polyarylene sulfide composition according to claim 14.

24. An overmolding comprising the melt processed polyarylene sulfide composition according to claim 14.

25. The overmolding of claim 23, wherein the overmolding is a component of an electronic device.

26. A melt processed polyarylene sulfide composition comprising:
a polyarylene sulfide;
a disulfide compound; and
a filler;
wherein the melt processed polyarylene sulfide composition has a melt viscosity of less than about 2000 poise as determined in accordance with ISO Test No. 11443 at a shear rate of 1200 s$^{-1}$ and at a temperature of 310° C., wherein the melt viscosity of the melt processed polyarylene sulfide composition is lower than the melt viscosity of the polyarylene sulfide as determined in accordance with ISO Test No. 11443 at a shear rate of 1200 s$^{-1}$ and at a temperature of 310° C., and wherein the melt processed polyarylene sulfide composition has a chlorine content of less than about 1000 ppm.

* * * * *